United States Patent [19]

Togashi

[11] Patent Number: 4,622,590
[45] Date of Patent: Nov. 11, 1986

[54] METHOD OF DRIVING A DISPLAY DEVICE

[76] Inventor: Seigo Togashi, c/o Citizen Watch Co., Ltd., Technical Laboratory, 840 Azatakeno, Ooazashimotomi, Tokorozawa-shi, Saitama-ken, Japan

[21] Appl. No.: 583,307

[22] Filed: Feb. 24, 1984

[30] Foreign Application Priority Data

Feb. 28, 1983 [JP] Japan .................... 58-032169

[51] Int. Cl.⁴ .................................. H04N 3/14
[52] U.S. Cl. ........................ 358/241; 340/811; 340/825.81
[58] Field of Search ............ 358/241, 236; 340/784, 340/811, 825.89, 825.81

[56] References Cited

U.S. PATENT DOCUMENTS

| | | | |
|---|---|---|---|
| 4,233,603 | 11/1980 | Castleberry | 340/811 X |
| 4,455,576 | 6/1984 | Hoshi | 358/241 |
| 4,471,347 | 9/1984 | Nakazawa et al. | 340/811 X |

Primary Examiner—James J. Groody
Assistant Examiner—E. Anne Toth

[57] ABSTRACT

A method of driving an active matrix display device which includes row electrodes, column electrodes, and active elements and display members provided at crossing points of the row and column electrodes and having a storing function is disclosed. According to the method, a serial video signal is stored into the individual column electrodes, and then at a next timing, a group of the active elements corresponding to particular ones of the row electrodes are rendered operative to cause signals to be stored into corresponding ones of the display members. This method thus attains uniform writing, uniform display and simplification of circuitry.

4 Claims, 13 Drawing Figures

FIG. 8
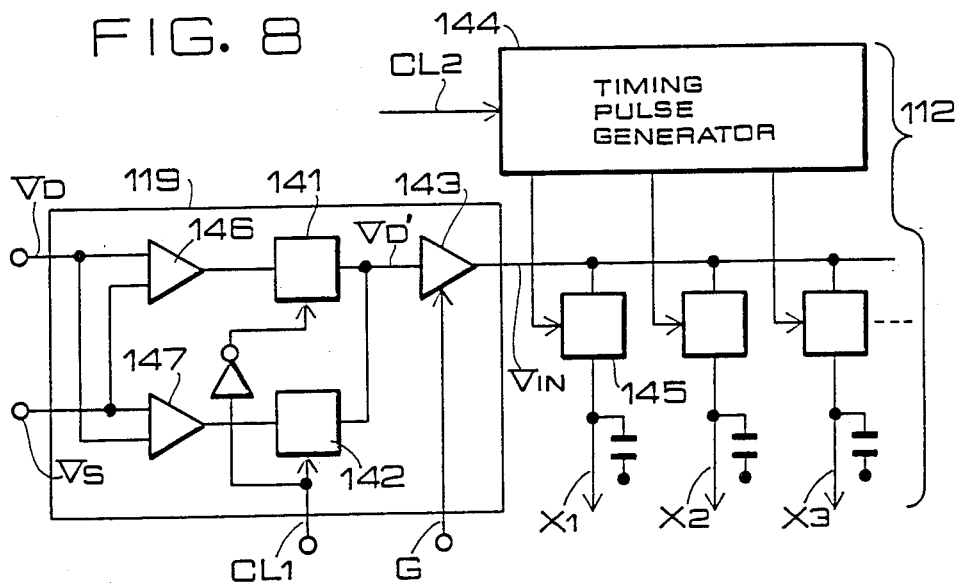
FIG. 9
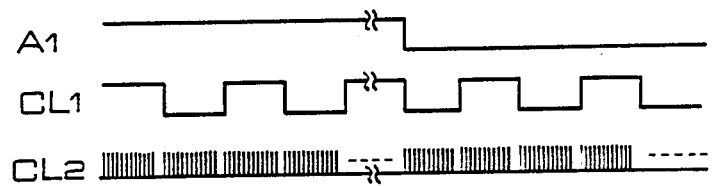
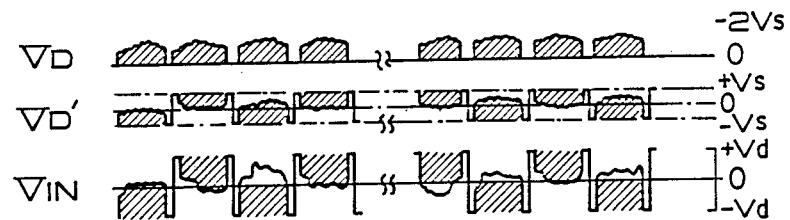

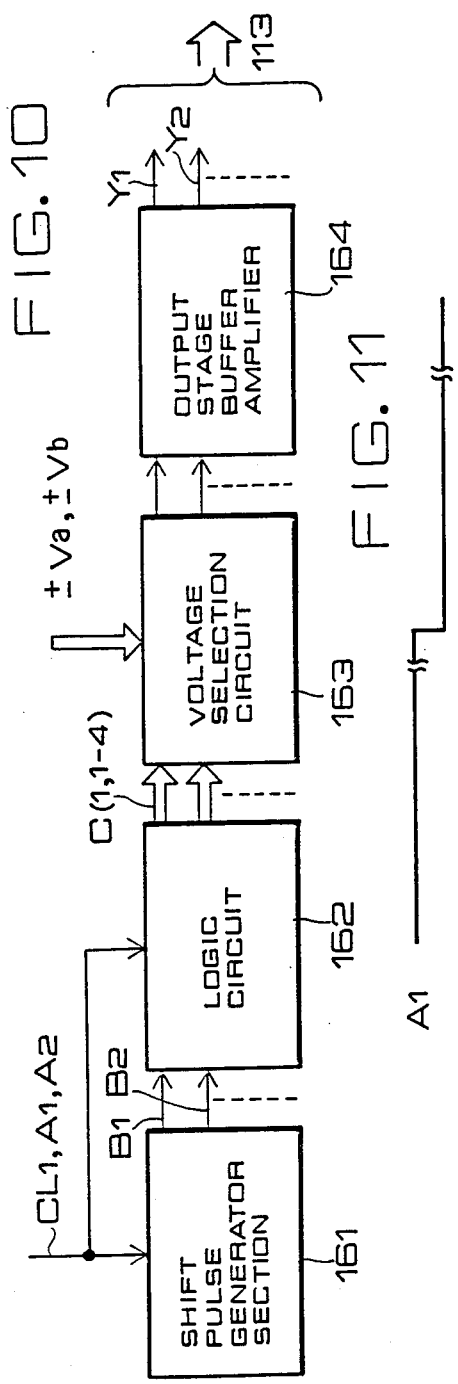
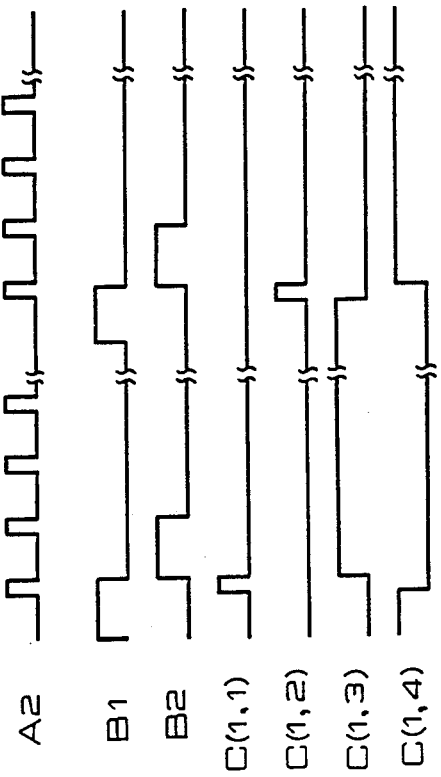
FIG. 10
FIG. 11

METHOD OF DRIVING A DISPLAY DEVICE

BACKGROUND OF THE INVENTION

Field of the Invention

This invention relates to a method of driving a display device, and more particularly to a method of driving a display device commonly known as an active matrix display device wherein an active element and a display element are provided for each picture element.

In recent years, display devices of an active matrix type have been developed very popularly. This type of display devices is disclosed, for example, in an article by Bernard J. Lechner et al, pp. 1566 to 1579, PROCEEDINGS OF THE IEEE, Volume 59. This type would enable matrix display of a high density even with display devices having a bad threshold characteristic such as liquid crystal by incorporating an active element such as a transistor or a non-linear resistor element having a chargeable facility in corresponding relationship to a display element of each picture element. Methods of driving a display device of the type include principally an element-at-a-time addressing method and a line-at-a-time addressing method, which are both already known by the above mentioned article by B. J. Lechner et al (p. 1570). The element-at-a-time addressing method is disclosed in detail in Japanese Laid-Open Patent Application No. 49-74438, especially with reference to FIG. 6 and so on of the patent. Both known driving methods are now described with reference to FIGS. 1 to 3 of the accompanying drawings.

Referring first to FIG. 1 which is a block circuit diagram of a conventional display device, reference numeral 1 designates a display section which includes row electrodes $C_1, C_2, \ldots, C_N$ and column electrodes $R_1, R_2, \ldots, R_M$, and active elements 2 and display elements 3 disposed corresponding to crossing points of the row and column electrodes. Reference numeral 8 designates a row driving section which supplies time-divided scanning signals to the row electrodes. Reference numeral 9 designates a column driving section which supplies data signals to the column electrodes. In the case of the element-at-a-time addressing method, the row driving section 9 includes a sampling pulse generating circuit 7, and switching gates 6 and storage capacitors 5.

Referring to FIG. 2 which is a timing chart of the device of FIG. 1, a serial video signal VD is transmitted to the display elements of the individual picture elements in response to sampling pulses $S_1, S_2, \ldots, S_M$ and scanning signals $C_1, C_2, \ldots, C_N$.

Now, the driving method by line-at-a-time addressing will be described with reference to FIG. 3.

The device of FIG. 3 is different at a portion of the column driving section 9 indicated at 30 from that of FIG. 1. In the element-at-a-time addressing method, a video signal VD is transmitted directly to the column electrodes by the switching gates 6, but in the line-at-a-time addressing method, a video signal VD is latched into first analog latches 31 in response to operation of the sampling pulse generator 7 and then latched collectively into second analog latches 32 for establishing an intended time relationship. The signals thus latched are then supplied to the individual column electrodes through respective amplifiers 33.

Comparison is now given between the element-at-a-time addressing method and the line-at-a-time addressing method.

First, an advantage of the element-at-a-time addressing method is that circuitry therefor is simple in construction. In particular, the element-at-a-time addressing method eliminates the necessity of two stages of analog latches which are necessitated in the line-at-a-time addressing method. Normally, an analog latch of high speed, high resolution and low distortion features can be obtained but with difficulty, and hence, in this point, the element-at-a-time addressing method is more advantageous than the line-at-a-time addressing method. On the other hand, an advantage of the line-at-a-time addressing method is that even active elements of a display section which have rather low responsiveness and a rather bad threshold level characteristic can be utilized therefor. For a display including 500 rows and 500 columns and having a frame synchronization of 60 Hz, in the case of the line-at-a-time addressing method on one hand, a period of time of one $500 \times 60$th second (33 microseconds) is sufficient for a writing operation while in the case of the element-at-a-time addressing method on the other hand, a writing operation must be done within a period of time of one $500 \times 500 \times 60$th second (66 nanoseconds) in the minimum.

Further, since in the case of the element-at-a-time addressing method electric charges are stored in wiring capacitors and storage capacitors, periods of time actually required for writing operations for individual column are differentiated from one another, and in the example of FIG. 1, they become longer toward the leftmost column and become shorter toward the rightmost column.

In summary, the element-at-a-time addressing method is advantageous in simpler construction of circuitry therefor than the line-at-a-time addressing method while the former has a defect that a period of time required for a writing operation must be short and is not constant or uniform.

In the meantime, typical ones of active elements which can be used in an active matrix are TFTs (thin film transistors) and non-linear resistor elements, and in most cases, a-Si (amorphous silicon) is used as a material for them.

For example, at present a-Si TFTs are studied in more than twenty research organizations in Japan. However, low mobility of carriers thereof makes it difficult to effect a writing operation in a period of time less than 1 microsecond, and hence, they cannot be well applied to the element-at-a-time addressing method. Further, an a-Si diode ring has a large driving capacity and it is not impossible to attain a writing operation in 10 nanoseconds, but since a threshold level characteristic is not completely established, a difference in contrast may be caused to appear due to a difference of writing periods of time, and hence, it cannot be well applied to the element-at-a-time addressing method.

SUMMARY OF THE INVENTION

It is a principal object of the present invention to provide a very useful method of driving a display device which eliminates such defects of the conventional methods as described above.

It is another object of the invention to provide a method of driving a display device which, while it is theoretically a line-at-a-time addressing method, allows use of a circuit which is as simple as a circuit normally used in the element-at-a-time addressing method.

It is a further object of the invention to provide a method of driving a display device which sufficiently allows use of active elements having responsiveness similar to that of a-Si TFTs and non-linear resistor elements having an unsatisfactory threshold level characteristic such as a-Si diode rings, varistors and so on.

Further objects and advantages will be made apparent from the following detailed description given in conjunction with the accompanying drawing.

BRIEF DESCRIPTION OF THE DRAWINGS

FIG. 8 is a circuit diagram showing a video modulating circuit and a column electrode driving circuit;

FIG. 9 is a diagram showing waveforms of signals appearing in the circuitry of FIG. 8;

FIG. 10 is a circuit diagram showing a row electrode driving circuit;

FIG. 11 is a diagram showing waveforms of signals appearing in the circuitry of FIG. 10;

DESCRIPTION OF THE PREFERRED EMBODIMENTS

Preferred embodiments of the present invention will now be described with reference to FIGS. 4 to 13.

Figure 1:
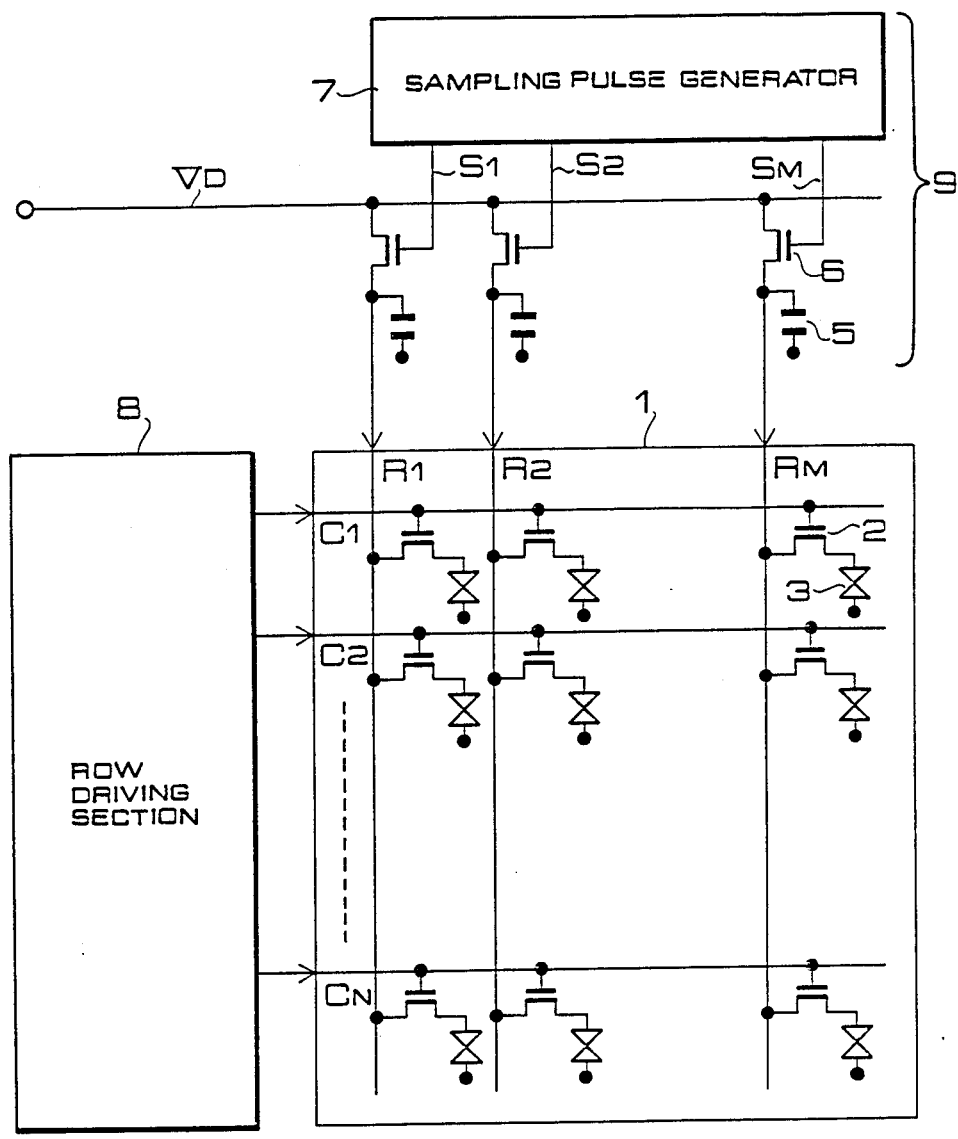
FIG. 1 is a block diagram showing a conventional display device.
Figure 3:
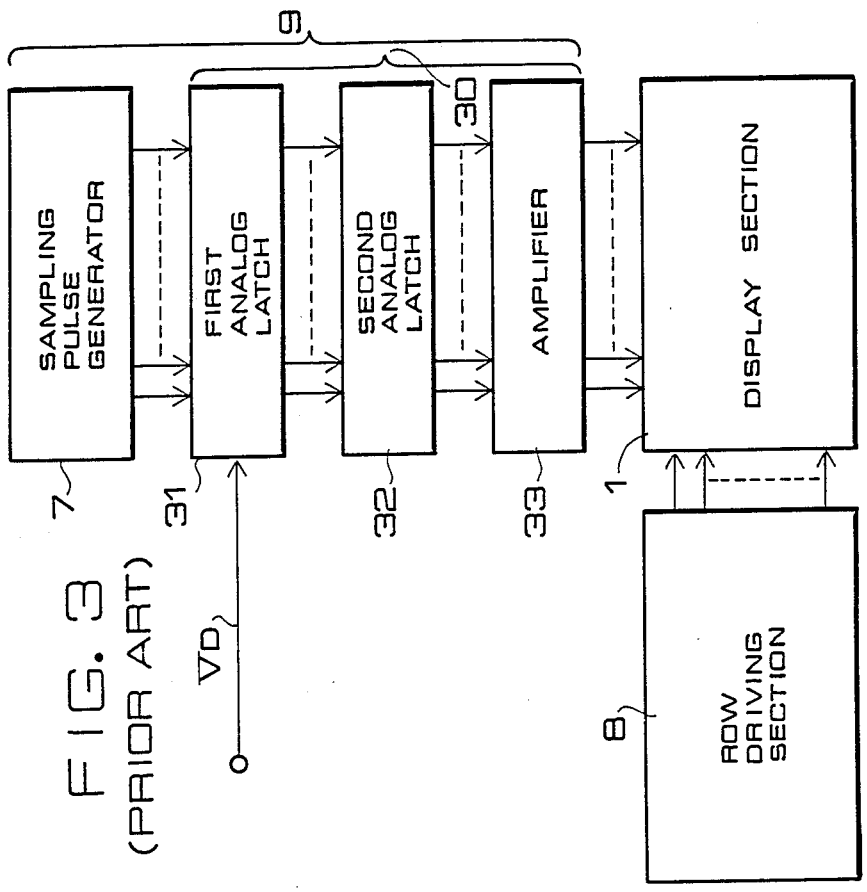
FIG. 3 is a block diagram showing another conventional display device constructed in accordance with a line-at-a-time addressing method.
Figure 2:
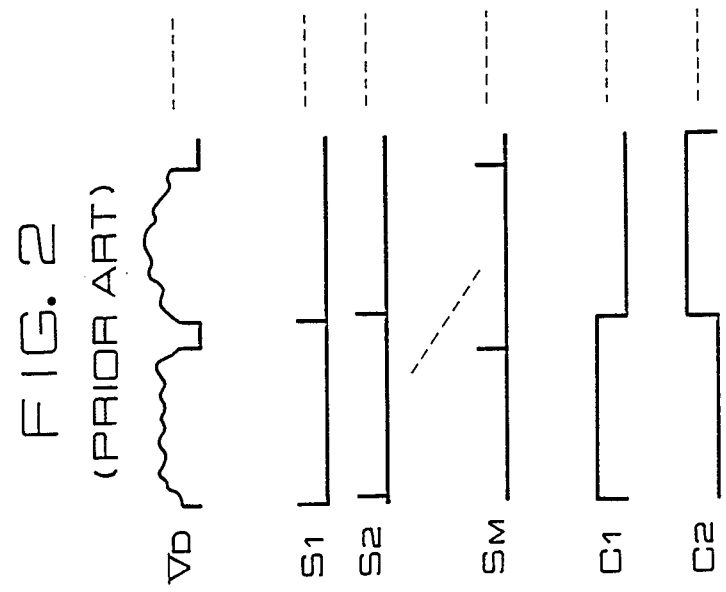
FIG. 2 is a diagram showing waveforms of driving signals in the conventional display device of FIG. 1.
Figure 4:
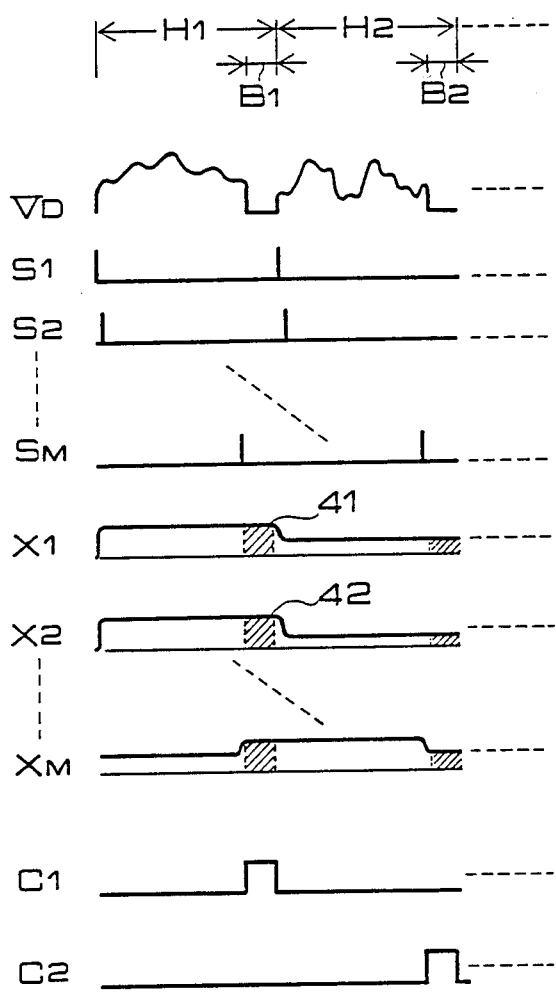
FIG. 4 is a diagram showing waveforms of driving signals in accordance with a driving method according to an embodiment of the present invention.

At first, an embodiment is described which employs a TFT as an active element. In this case, a block diagram of the display device is substantially similar to that of FIG. 1, but the waveform of driving signals is different from that of FIG. 2, as illustrated in FIG. 4. Reference symbol VD of FIG. 4 designates an analog video signal such as, for example, a video signal in accordance with the NTSC (National Television System Committee) standard.

Reference symbols $H_1, H_2, \ldots$ designate a horizontal scanning time while reference symbols $B_1, B_2, \ldots$ designate a horizontal retrace time. The signal VD is sampled with sampling pulses $S_1, S_2, \ldots, S_M$ and stored in storage capacitors as represented by reference symbols $X_1, X_2, \ldots,$ and $X_M$. In this case, since scanning signals $C_1$ and $C_2$ are at a non-selection level as different from the conventional case of FIG. 2, the signal VD is not transmitted directly to the individual display elements. In this way, the method of the present embodiment is basically not an element-at-a-time addressing method, and according to this method, after completion of writing of data in line-at-a-time addressing for each row, the thus written signals are written into individual display elements of each row in line-at-a-time addressing at a subsequent timing. Besides, a horizontal retrace time is used as a timing for writing information into a row of display elements at a time. For example, within a horizontal scanning time $H_1$, at first writing into the individual column is effected within a portion other than a portion $B_1$ of the horizontal scanning time $H_1$, and then within the following horizontal retrace period, the scanning signal $C_1$ is selected, whereafter signals as represented at hatched portions 41, 42, ... are written into the individual display elements.

Thus, this method could assure improvements with regard to complication of circuitry, responsiveness of active elements, irregularity or unevenness of writing times, and so on, as compared with conventional techniques. First, the circuitry is similar to that of the element-at-a-time addressing method and is thus simple in construction. Next, the writing time is shorter than that of the line-at-a-time addressing method but is not so short as that of the element-at-a-time addressing method. For example, the writing time of the element-at-a-time addressing method and the line-at-a-time addressing method according to the NTSC standard and the writing time of the present embodiment are 100 nsec., 60 μsec. and 10 μsec., respectively, and thus, the writing time of the embodiment is one sixth or so of that of the line-at-a-time addressing method and is a hundred times longer than that of the element-at-a-time addressing method. If the writing time is around such a value, an a-Si TFT can be satisfactorily used in the method of the embodiment. In this way, since the method of the invention is basically a line-at-a-time addressing method, the writing time is uniform, and there appears no unevenness in contrast.

Subsequently, another embodiment will be described in which an NLR (non-linear resistor element) is used as an active element.

Figure 5:
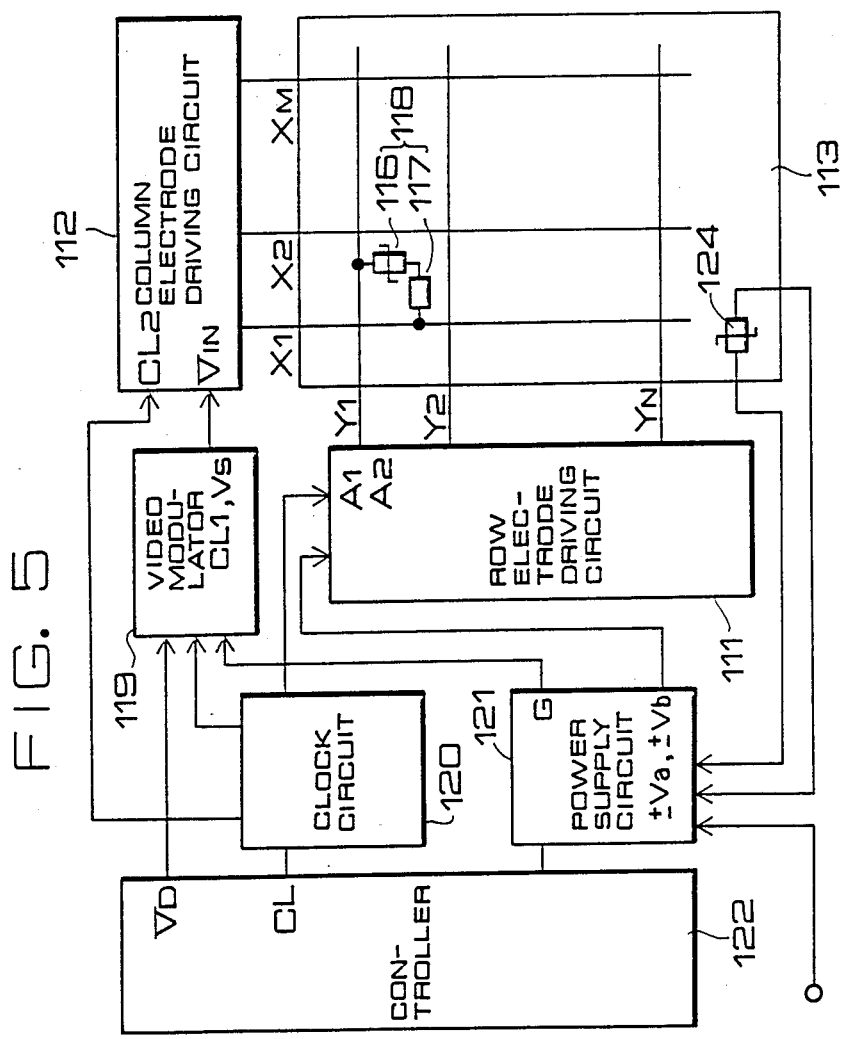
FIG. 5 is a block diagram of a non-linear type active matrix display device employing non-linear resistor elements to which the present invention is applied.

FIG. 5 is a block diagram of an NLR type active matrix display device to which the present invention is applied.

Reference numeral 113 designates a display section which includes row electrodes $Y_1$ to $Y_N$, column electrodes $X_1$ to $X_M$, and pixels or picture elements 118 connected to the row and column electrodes and each including a display members 117 and NLR element 116.

Reference numeral 120 depicts a clock circuit which supplies a video modulating circuit 119 with a clock signal $CL_1$, a column electrode driving circuit 112 with a clock signal $CL_2$, and a row electrode driving circuit 111 with clock signals $A_1, A_2$, respectively.

A power supply source 121 supplies the row electrode driving circuit 111 with $\pm Va, \pm Vb$, and the video modulating circuit 119 with a gain control signal G and reference signal $V_s$, respectively.

Reference numeral 124 illustrates NLR element provided at the display section. $(Va-Vb)$ and gain control signal G are set on the basis of characteristics I−V of the NLR element. Reference numeral 122 shows a controller comprising a video interphase circuit which supplies the video modulating circuit 119 with a video signal VD and an oscillating circuit which supplies the clock circuit 120 with a reference clock.

Figure 6:
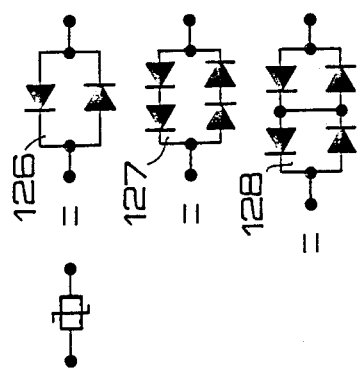
FIG. 6 is a diagrammatic representation of a non-linear resistor element employed in the device of FIG. 5.

In this embodiment, diode rings 126, 127 and 128 as shown in FIG. 6 may be used for the NLR elements 117 and 124.

Figure 7:
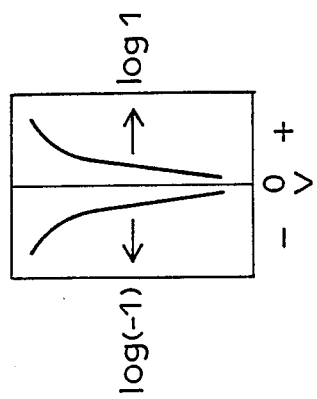
FIG. 7 is a diagram showing a current-voltage characteristic of the non-linear resistor element of FIG. 6.

FIG. 7 is a diagram showing a typical current-voltage characteristic, in which positive and negative portions are symmetrical relative to each other and which varies in an exponential manner in a low voltage region and varies in a proportional manner in a higher voltage region.

Reference numeral 112 designates a column electrode driving circuit, and 119 a video modulating circuit, and a block diagram and an example of waveforms of driving signals are shown in FIGS. 8 and 9, respectively. Reference symbol VD designates an input video signal. Reference symbol $V_s$ designates a reference voltage which has a magnitude about one half of the maximum amplitude of the VD, and $CL_1$ a clock signal which is inverted at a timing of selection of an individual row. The video signal VD is changed into a signal inverted around the 0 level after every 1H period such as shown by VD' by amplifiers 146, 147 and switches 141, 142, and then changed into a signal such as shown by $V_{IN}$ by an amplifier 143 which is gain controlled by an output of a compensating circuit.

Reference numeral 144 designates a timing pulse generating circuit which is clocked by clock signals $CL_2$ to select the switches 145 in a sequence so as to couple the video signal line $V_{IN}$ to the individual column electrodes $X_1, X_2, X_3, \ldots$ to store signals in the respective electrode capacitors. An example of data signals thus stored is shown by Xm of FIG. 12. The signal of the example is a signal which is inverted in polarity after every period 1H such that, if $-Vd$ is a non-lighting level and Vd is a lighting level at a row timing, then at a subsequent row timing, Vd is a non-lighting level and $-Vd$ is a lighting level.

FIGS. 10 and 11 are a block diagram of a row electrode driving circuit and a diagram of waveforms of signals of the circuit. This circuit provides to row electrodes a scanning signal which is inverted in polarity for every row as designated by $Y_{n-2}, Y_{n-1}, Y_n, Y_{n+1}$ of FIG. 12. Reference numeral 161 designates a shift pulse generating section composed of a shift register or a decoder and is clocked by clock pulses $A_1, A_2$ to provide shift pulses $B_1, B_2, \ldots$ A logic circuit 162 is clocked by clock pulses $A_1, A_2, CL_1,$ and $B_1, B_2, \ldots$ to generate pulses such as those designated by $C_{(1, 1-4)}, C_{(2, 1-4)}$ and so on, which are supplied to a voltage selection circuit 163.

Figure 12:
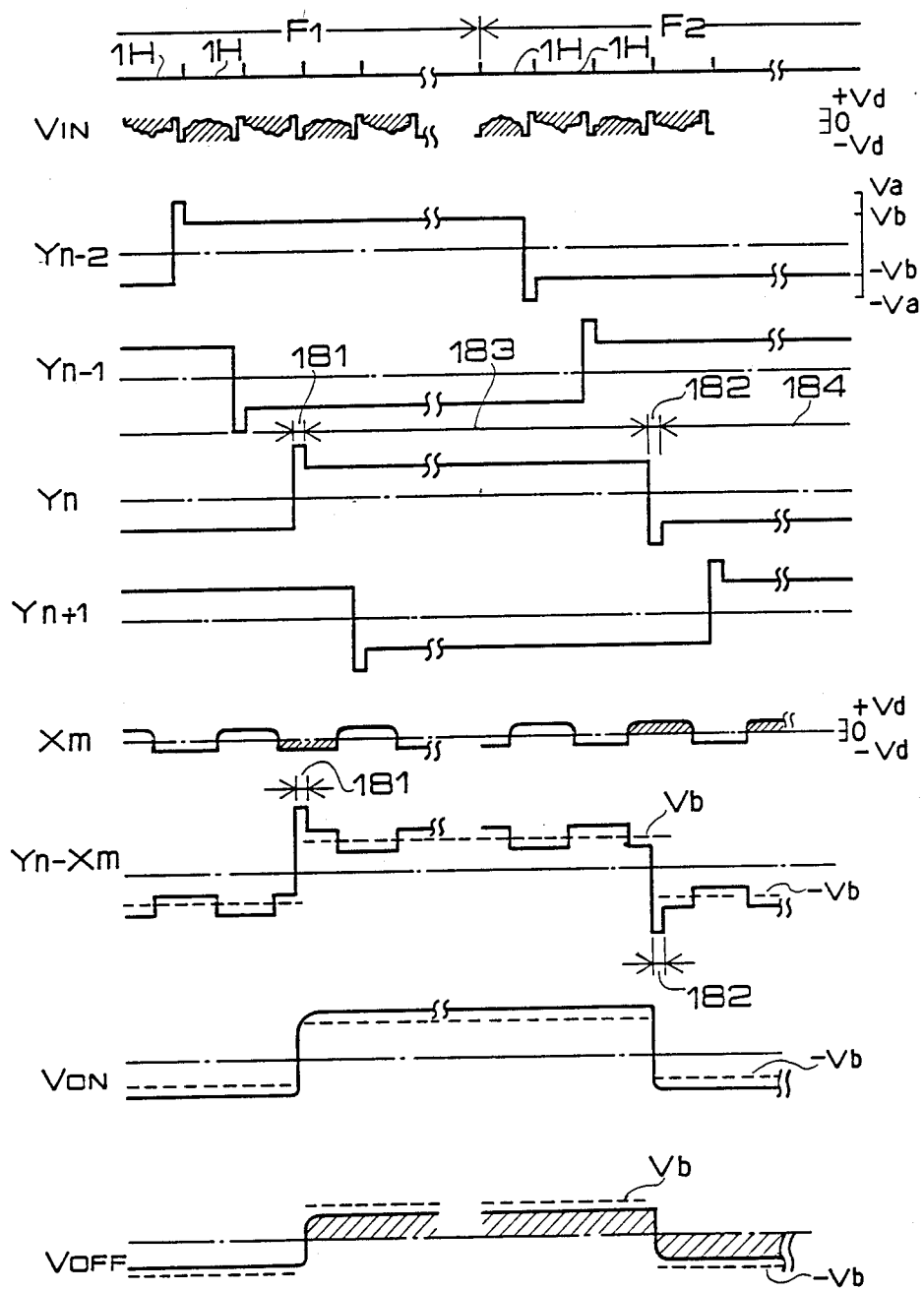
FIG. 12 is a diagram showing waveforms of scanning signals, data signals and signals supplied to the display elements.

Supplied to the voltage selection circuit 163 are voltages $\pm Va, \pm Vb$ as shown at $Y_{n-2}$ of FIG. 12 or a voltage proportional to such voltages $\pm Va, \pm Vb$, one of which is selected in response to $C_{(n, 1-4)}$.

One of characteristics of the present embodiment resides in its scanning signal. For example, when $Y_n$ is taken into consideration, there are two selecting periods 181, 182 and two non-selecting periods 183, 184, which present a voltage $\pm Va$ and a voltage $\pm Vb$, respectively. During each selecting period, row electrodes are scanned in line-at-a-time addressing, but a selecting period does not include the entire period 1H assigned thereto but is constituted only from a horizontal retrace period. During the remainder of a horizontal scanning period, no scanning signal is selected, and signals are written into the individual column electrode capacitors in the line-at-a-time addressing as described above with reference to FIGS. 8 and 9. By such a construction as described above, while the display device is constituted in the line-at-a-time addressing type, the necessity of a sample hold circuit can be eliminated in the same manner as in the element-at-a-time addressing, and there appears no difference in quantity of electric charge in display elements arising from differences in effective writing times among individual column as in the element-at-a-time addressing. Particularly in an NLR matrix, a difference in the writing time is a fatal defect, and thus, the element-at-a-time addressing method cannot be possibly applied to the NLR matrix and is complicated in construction of the circuitry. But, according to the present invention, the NLR matrix can be constituted very advantageously from a circuit which is as simple as that of the element-at-a-time addressing method.

Figure 13:
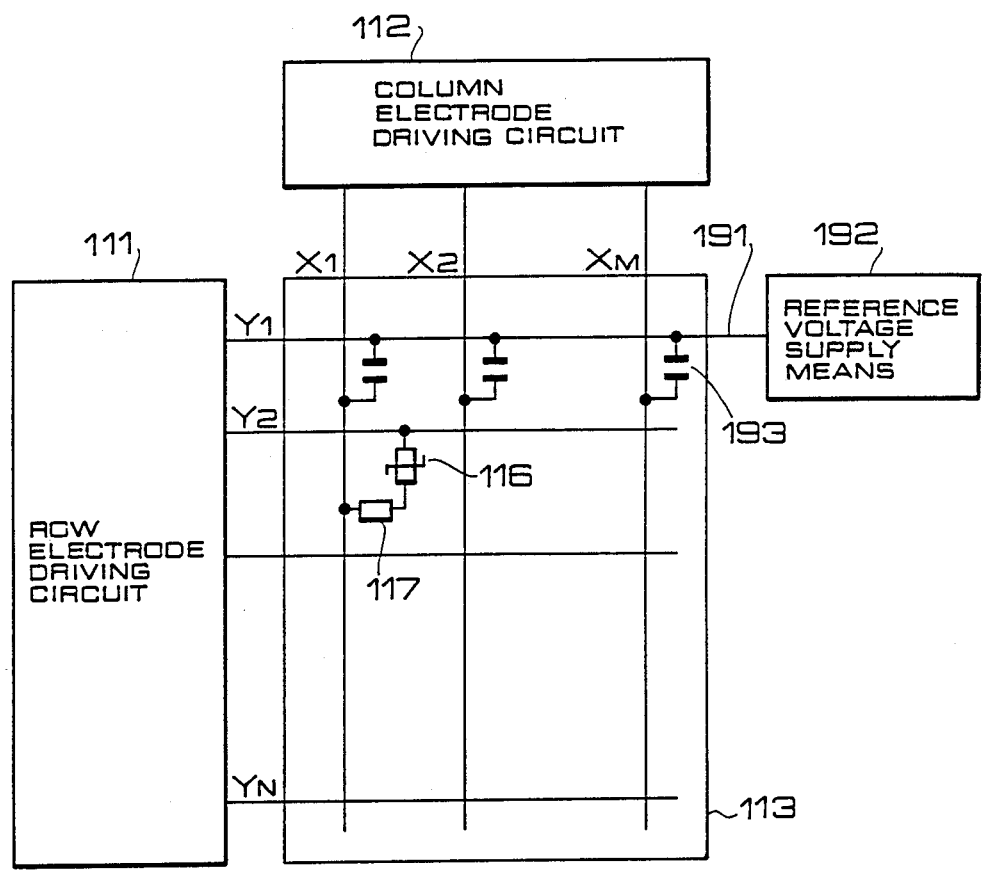
FIG. 13 is a block diagram showing other embodiment of NLR matrix display device to which the present invention is applied.

FIG. 13 is a block diagram showing other embodiment of NLR matrix display device to which the present invention is applied, in which reference numeral 113 is a display section. The display section 113 comprises a liquid crystal panel interposed by two base plates. On one base plate, row electrodes $Y_1, Y_2, \ldots, Y_N$ and an NLR element 116 are formed and on the other base plate, column electrodes $X_1, X_2, \ldots, X_M$ on the base plate. Reference numeral 192 depicts a means for applying a reference electrode 191 with a reference voltage. Thus this structure enables that a capacitance as a dielectric of a liquid crystal is applied to each column electrode so as to reduce influences of noises when video signals are stored at the column electrodes and are transmitted to display elements.

As apparent from the foregoing description, if a driving method according to the present invention is applied, display with a sufficient contrast can be attained in a simple circuit composed of active elements which are available at present.

Further, while in the embodiments described above each horizontal retrace time is used as a whole for a writing timing, part of each horizontal retrace time may otherwise be used for a writing timing. Besides, by changing a reading timing to temporarily store display data in a memory or by similar means, the timing can be set optionally.

What is claimed is:

1. A method of driving a display device which includes row electrodes, column electrodes, and a active elements and display members provided at crossing points of said row and column electrodes and having a storing function, comprising the steps of: storing at first a serial video signal into individual ones of said column electrodes, and then at a next timing, rendering operative a group of said active elements corresponding to particular ones of said row electrodes, causing signals to be stored into corresponding ones of said display members, further wherein the serial video signal is a signal which has a horizontal retrace period, and rendering operative the group of said active elements during at least part of the horizontal retrace period.

2. A method of driving a display device according to claim 1, wherein the group of said active elements are each constituted from a non-linear resistor element.

3. A method of driving a display device according to claim 1, further applying to each of said column electrodes a capacitance as a dielectric of a liquid crystal so as to reduce influences of noises when video signals are stored at said column electrodes and transmitted to said display device.

4. A method of driving a display device which includes row electrodes, column electrodes, and active elements and display elements provided at crossing points of said row and column electrodes, comprising the steps of: dividing a video signal into two periods consisting of a first period and a second period during one scanning period, providing in said first period, non-selected scanning signals to said row electrodes and storing said video signal into individual ones of said column electrodes sequentially, providing in said second period, selected scanning signals to particular ones of said row electrodes which render operative a group of said active elements corresponding to the row electrodes thereby causing signals stored in column electrodes to be stored into the corresponding display elements, respectively, further wherein at least a portion of said video signal is a signal having a horizontal retrace period, and rendering operative said group of said active elements during at least part of said horizontal retrace period.

* * * * *